3,041,367
PROCESS FOR THE MANUFACTURE OF PHOSPHORUS-CONTAINING ESTERS

Jean Pierre Leber and Karl Lutz, both of Basel, Switzerland, assignors to Sandoz Ltd., Basel, Switzerland
No Drawing. Filed June 19, 1961, Ser. No. 123,346
Claims priority, application Switzerland July 8, 1960
21 Claims. (Cl. 260—461)

The present invention is concerned more especially with the preparation of per se known phosphorus-containing esters of the formula

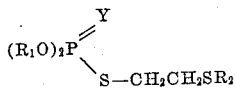     (A)

wherein each of $R_1$ and $R_2$ represents an alkyl group with at least one and at most two carbon atoms (i.e. methyl and ethyl), and Y represents an oxygen atom or a sulfur atom, and wherein $R_2$ may also represent an aliphatic chain interrupted by an oxygen atom (as e.g. —$CH_2CH_2OC_2H_5$, etc.) or by a sulfur atom (as e.g. —$CH_2CH_2SCH_3$, —$CH_2CH_2SC_2H_5$, etc.). $R_2$ may also represent an aryl radical (as e.g. phenyl, tolyl, etc.), an aralkyl radical (as e.g. benzyl, phenyl-ethyl, etc.) or a heterocyclic radical (as e.g. pyridyl, pyrimidyl, etc.).

The compounds of formula A as above described are known to have valuable insecticidal activity and have been used inter alia in the preparation of compositions useful in combating aphis and other garden insects as well as household insects.

A number of processes are known for the preparation of Compounds A. Of these, the following are the most important:

(1) The reaction of compounds of the formula $R_2SC_2H_4$-Hal with salts of dialkylthiolphosphoric acids or of dialkyldithio-phosphoric acids or with the corresponding free acids themselves, if necessary in the presence of a basic acid-binding agent which fixes the hydrogen halide formed.

(2) Replacement of the halogen atoms in compounds of the formula $(R_1O)_2PYSC_2H_4$-Hal, in which Hal stands for Cl or for Br and Y stands for O or S, by the radical $SR_2$ which is derived from a mercaptan $HSR_2$.

(3) Reaction of dialkyl-phosphoric acid halides or dialkylthiophosphoric acid halides with compounds of the formula $R_2SC_2H_4SH$ in the presence of a basic acid-binding agent fixing the hydrogen halide formed.

All these prior processes have the drawback that they necessitate the manufacture of intermediate products which are expensive or difficult to handle. In particular, for the simplest of the above processes, i.e. that denoted as (1), it is necessary first to manufacture compounds of the formula $R_2SC_2H_4$-Hal, which is generally done by esterifying an alcohol of the formula $R_2SC_2H_4OH$ with gaseous hydrogen chloride or by adding to this alcohol substances which liberate hydrogen chloride. This makes it necessary to use a plant which is resistant to the corrosion of this acid. Also compounds of the type $R_2SC_2H_4$-Hal are poisonous. They have an effect similar to mustard gas so that persons who come into contact with these compounds must take special precautions.

In the second of the above mentioned processes, the intermediate product of the formula $$(R_1O)_2PY-SC_2H_4\text{-Hal}$$

is expensive and it must be condensed with a mercaptan of the formula $HSR_2$, a compound which on account of its almost unbearable smell is very difficult to handle industrially.

The third process necessitates first of all the manufacture of a compound of the formula $R_2SC_2H_4$-Hal the drawbacks of which have already been described above, since this is necessary for the manufacture of the mercaptan of the formula $R_2SC_2H_4SH$.

The primary purpose of the present invention is the embodiment of a process for the manufacture of Compounds A, which process is free of the several aforesaid drawbacks of the known processes. This purpose is realized by the present invention by the expedient of developing a process which does not require the use of compounds of the formula $R_2SC_2H_4$-Hal and which consequently enables the above detailed prior art drawbacks to be avoided. According to the present invention, only hydroxyethylalkyl-sulphides and dialkyldithio-phosphoric acids or dialkyl-thiol-phosphoric acids are necessary, which gives the Compounds A in a single reaction.

The process according to the invention for the manufacture of the phosphorus-containing esters of the formula

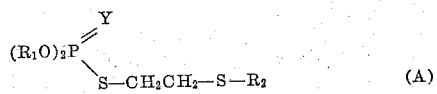     (A)

is characterized in that an acid of the Formula I

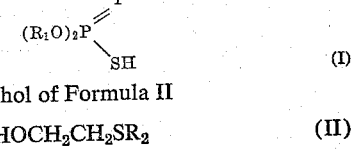     (I)

is reacted with an alcohol of Formula II $$HOCH_2CH_2SR_2 \quad (II)$$

in the presence of an acid which can yield protons or of a Lewis acid (these acids being denoted as III)[1] and that the water is removed as it is formed, $R_1$, $R_2$ and Y in the preceding formulae having the afore-enumerated significances.

The process according to the invention is advantageously carried out as follows. An acid III is added to an alcohol of Formula II at a fairly low or average temperature, optionally in a suitable solvent such as chlorobenzene, ethylene dichloride, dioxane or a carboxylic acid dialkylamide with lower alkyl groups, as e.g. dimethylformamide.

Then 1 mol of an acid according to Formula I is added all at once or gradually at a low, normal or raised temperature. Here the acid can be used as such or dissolved in a usual solvent. The acid I can also be added in the form of an alkali metal salt in which case however, in the reaction of mixing an alcohol II and an acid III a sufficiently strong acid must be added in order to set free the acid I from the salt. Such a process can be particularly appropriate if an acid according to Formula I is used in which Y stands for an oxygen atom.

The order in which the reactants are mixed can be varied. The reaction mixture is stirred at ambient temperature or at a raised temperature and the water formed during the reaction is removed by the use of reduced pressure or by azeotropic distillation or by the addition of a strong dehydrating agent. The addition of the dehydrating agent can be made at the moment when the alcohol II is mixed with the acid III. If the dehydrating agent is a proton- or Lewis-acid it is not necessary to add another acid of this kind as a catalyst.

It is wholly unexpected that the esterification of thiophosphoric acids or of dithiophosphoric acids with alcohols could be carried out in this way. Prior workers have reported that in all trials of the direct esterification of dialkyldithiophosphoric acids it had not been possible to make neutral esters. Only a mixture of the alcohol ---
[1] Or a mixture of such acids.

and acid was obtained which contained decomposition products of these participants of the reaction.

In order to get higher yields by the process of the present invention, it is advantageous to work in a solvent, as e.g. amides of carbonic and low molecular carboxylic acids such as formamide and dimethylformamide, dioxane, sulphuric acid (use of excess of the acid which then acts as the solvent), xylene or of an excess of the alcohol II, or a mixture of the said solvents. The solvent can be recovered partly or completely.

In a preferred embodiment of the invention, each $R_1$ is ethyl or methyl, Y is O or S, and $R_2$ is ethyl. Otherwise stated, the preferred compounds of Formula I are diethyldithiophosphoric acid, dimethyldithiophosphoric acid, diethylthiolphosphoric acid and dimethylthiolphosphoric acid, while the preferred compound of Formula II, which is preferred inter alia because it leads to good yields and to products which can easily be purified by distillation, is hydroxyethylethylsulphide.

Examples of compounds of Formula III are sulphuric acid, methanesulphonic acid, sulphuric acid anhydride, zinc chloride, etc. As strong dehydrating agents, sulphuric acid anhydride, phosphorus pentoxide, and zinc chloride are preferred. It is particularly advantageous to use a mixture of anhydrous sulphuric acid and sulphuric acid anhydride (technical oleum), since this mixture has acid properties as well as being a dehydrating agent.

According to the invention, good yields of products are obtained, the smell of which is considerably less unpleasant than that of the products made by the known processes.

The following examples set forth presently preferred embodiments which illustrate but do not limit the present invention. Yields are given in percentages calculated on the theoretical yield. Temperatures are given in degrees centigrade. Percentages are by weight. Parts by weight bear the same relationship to parts by volume as do grams to milliliters.

*Example 1*

3 parts by weight (0.03 mol) of concentrated sulphuric acid are added to 44 parts by weight (0.4 mol) of hydroxyethylethylsulphide at 10 to 20°. Then 74 parts by weight (0.4 mol) of diethyldithiophosphoric acid are stirred in dropwise in the course of 4 hours under reduced pressure at 60°. Finally, the mixture is stirred for 3 hours longer at 60°.

Chloroform is added to the cooled reaction mixture and it is then extracted, first with water, then with 5% sodium hydroxide solution and finally again with water. The chloroform solution is dried and evaporated.

71 parts by weight of a liquid residue remain having the refractive index $n_D^{20}=1.5372$. This can be distilled under reduced pressure, but 7% remain after distillation. The main fraction consists of 62 parts by weight of pure $(C_2H_5O)_2PS_2C_2H_4SC_2H_5$. B.P. at 0.1 mm.=105 to 106°. Yield: 57% of pure product.

*Example 2*

Example 1 is repeated. However, this time 20 parts by weight (0.2 mol) of concentrated sulphuric acid are used, instead of the 3 parts by weight used in Example 1.

A liquid residue of 82 parts by weight is obtained, the refractive index $n_D^{20}$ of which is 1.5382 and which is completely distillable under reduced pressure. The main fraction consists of 70 parts by weight of pure $(C_2H_5O)_2PS_2C_2H_4SC_2H_5$. B.P. at 0.1 mm.=105 to 106°; $n_D^{20}=1.5330$. Yield: 64% of pure product.

*Example 3*

32 parts by weight (0.2 mol) of dimethyldithiophosphoric acid in 40 parts by volume of chlorobenzene are added to a mixture of 19.5 parts by weight (0.2 mol) of concentrated sulphuric acid and 22 parts by weight (0.2 mol) of hydroxyethylethylsulphide.

The suspension is rapidly agitated and during 4 hours at 50° under reduced pressure the azeotrope of chlorobenzene and water is distilled off. (During this period 4 portions, each of 40 parts by volume of chlorobenzene are added.)

The reaction mixture is then decanted and the chlorobenzene layer is washed first with aqueous 5% sodium hydroxide solution and then with water, then it is dried and evaporated.

41 parts by weight of a liquid residue are obtained which have a refractive index $n_D^{20}$ of 1.5503. Paper chromatography of a sample (a special quantitative determination which consists of a comparison of the surface of these zones) shows a content of at least 60% of the compound of the formula $(CH_3O)_2PS_2C_2H_4SC_2H_5$.

*Example 4*

20 parts by weight of concentrated sulphuric acid are added drop by drop at 0° to 22 parts by weight (0.2 mol) of hydroxyethylethylsulphide in 30 parts by volume of chlorobenzene. The temperature is then raised to 60° and 37.5 parts by weight (0.2 mol) of diethyldithiophosphoric acid are added. The reaction mixture is stirred at 60° for 3 hours and then washed as in Example 3. After distilling off the chlorobenzene, 32 parts by weight of a colorless liquid are left, the refractive index $n_D^{20}$ of which is 1.5370, and which yields on distillation 23 parts by weight of the pure compound

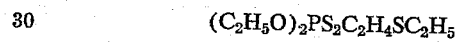

*Example 5*

20 parts by weight of concentrated sulphuric acid are added drop by drop at 0 to 10° to 66 parts by weight (0.6 mol) of hydroxyethylethylsulphide. Then the temperature is raised to 40° and 37.5 parts by weight (0.2 mol) of diethyldithiophosphoric acid are added drop by drop during 2 hours at this temperature. Then the reaction mixture is stirred for 1 hour at 40° and then for 2 hours at 60°. The reaction mixture is then treated as described in Example 1.

57 parts by weight of a liquid are obtained, the refractive index $n_D^{20}$ of which is 1.5348 and which yields after distillation 43 parts by weight of the pure compound $(C_2H_5O)_2PS_2C_2H_4SC_2H_5$. Yield: 78.5% of the pure product.

*Example 6*

20 parts by weight (0.2 mol) of methanesulphonic acid are added slowly at 0° to 22 parts by weight (0.2 mol) of hydroxyethylethylsulphide. Then 37.5 parts by weight of diethyldithiophosphoric acid and 7 parts by weight phosphorus pentoxide are added, after which the mixture is heated up to 50°. After half an hour a further 7 parts by weight of phosphorus pentoxide are added and the mixture stirred for 4 hours at 60°. The reaction mixture is then taken up in chloroform and washed as described above.

42 parts by weight of a liquid residue are obtained, the refractive index $n_D^{20}$ of which is 1.5333 and which yields on distillation 36.5 parts by weight of the pure compound $(C_2H_5O)_2PS_2C_2H_4SC_2H_5$. Yield: 66.6% of pure product.

*Example 7*

14 parts by weight (0.1 mol) of anhydrous zinc chloride are added to a mixture of 22 parts by weight (0.2 mol) of hydroxyethylethylsulphide and 37.5 parts by weight of diethyldithiophosphoric acid and then the mixture is stirred for 3 hours at 60°.

The reaction mixture is then treated as in Example 1, and after evaporating off the chloroform, a liquid residue of 45 parts by weight remains, the refractive index $n_D^{20}$ of which is 1.5334 and which yields on distillation 39 parts by weight of the compound $(C_2H_5O)_2PS_2C_2H_4SC_2H_5$. Yield: 71.3% of pure product.

Example 8

24 parts by weight (0.3 mol) of sulphuric acid anhydride are added to 250 parts by volume of dioxane with vigorous stirring at 0° to 10° and then 32.5 parts by weight (0.3 mol) of hydroxyethylethylsulphide are added under the same conditions. A precipitate is formed which redissolves. Then 56 parts by weight (0.3 mol) of diethyldithiophosphoric acid are added during 3 hours at 60°. The reaction mixture is then taken up in a large quantity of water and extracted 3 times with chloroform. The chloroform solution is washed first with 5% sodium hydroxide solution and then with water, dried and evaporated. The yellowish liquid residue obtained, weighing 58 parts by weight, has a refractive index $n_D^{20}$ of 1.5362. On distillation, 35 parts by weight of the pure compound $(C_2H_5O)_2PS_2C_2H_4SC_2H_5$ are obtained. Yield: 42.6% of pure product.

Example 9

40 parts by weight (0.5 mol) of sulphuric acid anhydride are added drop by drop at 10 to 20° to 40 parts by weight (0.55 mol) of dimethylformamide. Then 1 part by volume of concentrated sulphuric acid is added, then 55 parts by weight (0.5 mol) of hydroxyethylethylsulphide are added at 20° in 40 minutes and finally 93 parts by weight (0.5 mol) of diethyldithiophosphoric acid at 60° during 4 hours. The mixture is stirred at 60° for half an hour, and then extracted with the chloroform and the chloroform solution is washed first with 5% NaOH solution and then with water, dried and evaporated.

120 parts by weight of a liquid residue are obtained, the refractive index $n_D^{20}$ of which is 1.5335 and this on distillation yields 115 parts by weight of the pure compound $(C_2H_5O)_2PS_2C_2H_4SC_2H_5$. Yield: 84% of the pure product.

If in the above example, the 1 part by volume of sulphuric acid were omitted under the same conditions, only 67 parts by weight of the same compound are obtained which corresponds to a yield of 50%.

Example 10

A mixture of 82 parts by weight (1.1 mol) of dimethylformamide and 74 parts by weight (0.7 mol) of hydroxyethylethylsulphide are added drop by drop during 1 hour at 20° to 82 parts by weight of 66% oleum (0.67 mol $SO_3$ and 0.29 mol $H_2SO_4$). The mixture is then heated to 60° and 106 parts by weight (0.67 mol) of dimethyldithiophosphoric acid are added during 4 hours. Agitation is continued for another half hour at 60° and then the reaction medium is extracted in the usual way.

152 parts by weight of a liquid crude product are obtained, the refractive index $n_D^{20}$ of which is 1.5508 and which contains 12.3% phosphorus and 39.1% sulphur (calculated for $(CH_3O)_2PS_2C_2H_4SC_2H_5$, P 12.6% and S 39.0%).

A paper chromatographic examination shows that the product consists at least of 95% of the pure compound. Yield: 84% of the pure product.

Example 11

40 parts by weight (0.4 mol) of sulphuric acid are added to 62 parts by weight of 66% oleum (0.5 mol $SO_3$ and 0.2 mol $H_2SO_4$) and then 62 parts by weight (0.85 mol) of dimethylformamide are added at 10 to 20° and lastly 53 parts by weight (0.5 mol) hydroxyethylethylsulphide are added. 96 parts by weight (0.5 mol) of a salt of the formula $(C_2H_5)_2PO—SNa$ are added gradually at 60° during 4 hours and then the mixture is stirred for another hour at 60°.

After working up the reaction medium as usual, 91 parts by weight of the product are obtained, the refractive index $n_D^{20}$ of which is 1.4948 and which yields, on distillation, 91.5 parts by weight of a compound of the formula $(C_2H_5O)_2PO—SC_2H_4SC_2H_5$. B.P. at 0.08 mm. =110–112°; $n_D^{20}$=1.4948. The analysis of the crude product is as follows:

Calculated: P, 12.01%; S, 24.03%. Found: P, 12.15%; S, 24.16%. Yield: 71% of the pure product.

Example 12

To a mixture of 20 parts by weight (0.2 mol) of concentrated sulphuric acid and 41 parts by weight of 66% oleum (0.33 mol $SO_3$ and 0.14 mol $H_2SO_4$), a mixture of 37 parts by weight (0.33 mol) of hydroxyethylethylsulphide and 41 parts by weight (0.55 mol) of dimethylformamide is added during 1 hour at 20°. Then during 4 hours at 60°, 54.2 parts by weight (0.33 mol) of a salt of the formula $(CH_3O)_2PO—SNa$ are added gradually. The mixture is then stirred for 1 hour at 60°, and finally extracted with chloroform.

42 parts by weight of a liquid with a refractive index $n_D^{20}$ of 1.5095 are obtained which, on distillation yield 40 parts by weight of a main fraction. B.P. at 0.1 mm. =115°; $n_D^{20}$=1.5052. The analysis is as follows.

For $(CH_3O)_2PO—SC_2H_4SC_2H_5$—Calculated: P, 13.4%; S, 27.9%. Found for the crude product: P, 12.3%; S, 28.2%. Found for the distilled product: P, 13.0%; S, 28.1%. Yield: 55% of the pure compound.

Example 13

61 parts by weight of 65% oleum (=0.5 mol $SO_3$) are added with agitation during 30 minutes to 61 parts by weight of dimethylformamide (DIF) so that the temperature does not rise above 50°. To the still easily stirred paste so obtained, there are added, drop by drop, during 15 minutes 55 parts by weight of hydroxyethylethylsulphide (=0.5 mol+about 4% excess), during which the temperature should not rise above 20°.

After finishing this operation, the reaction mass is heated to 60° and 156 parts by weight of a technical solution of dimethyldithiophosphoric acid in xylene (about 50%=0.5 mol dimethyldithiophosphoric acid) are added during 3 to 4 hours with agitation. After that, the reaction mixture is cooled to 20° and 100 parts by volume of water and 100 parts by volume of xylene are stirred into it. The lower layer consisting of dilute sulphuric acid is run off and the upper xylene layer is washed twice with water, once with 5% caustic soda solution and again with water.

The bulk of the xylene is distilled off at 50° and at 13 mm. pressure, after which in order completely to remove the solvent the reaction flask is connected to a high vacuum (0.1 mm.) for 1 hour at 50°. The residue is constituted by 121 parts by weight=98% theory. It consists, in the main, of a compound of the formula $(CH_3O)_2PSSC_2H_4SC_2H_5$ and has the following properties.

$n_D^{20}$=1.5512. P found: 12.3%. Calculated for the above formula: 12.6%. S found: 38.7%. Calculated for the above formula: 39.0%. B.P. 107° at 0.02 mm.— 111° at 0.06 mm. $n_D^{20}$ of the distilled product: 1.5516.

The paper chromatographic examination showed that the crude product had a degree of purity of at least 95%.

Example 14

To a mixture of 61 parts by weight of formamide (= about 1.35 mol) and 55 parts by weight of hydroxyethylethylsulphide (=0.5 mol+about 4% excess), 61 parts by weight oleum (=0.5 mol $SO_3$) are added drop by drop with agitation in about 20 to 30 minutes so that the temperature does not rise above 20°.

After ending this operation, the temperature is raised to 60° and then 156 parts by weight of a technical solution of dimethyldithiophosphoric acid in xylene (about 50%=0.5 mol dimethyldithiophosphoric acid) are added to the reaction mass with agitation during 3 to 4 hours. After this, stirring is continued for another 30 minutes at 60° and then the contents of the flask are cooled and diluted with 100 parts by volume of water and 200 parts by volume of xylene. This is worked up as described in Example 13 and a residue is obtained consisting of 104 parts by weight of a yellowish oil (=84% of theory) which, in the main, consists of a compound of the formula $(CH_3O)_2PSSC_2H_4SC_2H_5$ and which has the following properties.

$n_D^{20}$=1.5526. B.P. 110–115° at 0.08 mm. pressure: $n_D^{20}$ of the distilled product=1.5513.

The paper chromatographic examination shows a degree of purity of the crude product of at least 90%.

The expression "a fairly low or average temperature" as hereinbefore employed refers to a temperature within the range from −20° to +30° C.; the expression "a low, normal or raised temperature" refers to a temperature within the range from 10° to 70° C.; and the expression "ambient temperature or . . . a raised temperature" refers to temperatures within the range of about 20 to above 30° C. (ambient) and within the range from 50° to 70° C. (raised).

While hydroxyethylethylsulfide has been used as alcohol II in the foregoing examples because it is the preferred alcohol, it will be understood that this alcohol may just as well be replaced by equivalent quantities of other alcohols of Formula II, such e.g. as hydroxyethylphenylsulfide, hydroxyethylbenzylsulfide, hydroxyethyl-methylmercapto-ethylsulfide.

Having thus disclosed the invention, what is claimed is:

1. A process for the preparation of an ester of the formula

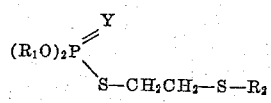

which comprises reacting an acid of the formula

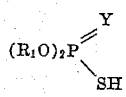

and an alcohol of the formula $$HOCH_2CH_2SR_2$$

in the presence of an acid selected from the group consisting of proton-acids and Lewis-acids including mixtures of such acids and operating in such a way, that any water of reaction is removed as it is formed, $R_1$ in the foregoing formulae being alkyl with 1 to 2 carbon atoms, and $R_2$ being a member selected from the group consisting of uninterrupted alkyl with 1 to 2 carbon atoms, alkylene-O-lower alkyl and alkylene-S-lower alkyl, and Y is a member selected from the group consisting of O and S.

2. A process for the preparation of an ester of the formula

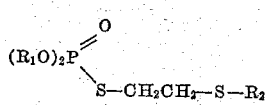

which comprises reacting an acid of the formula

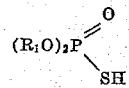

and an alcohol of the formula $$HOCH_2CH_2SR_2$$

in the presence of a proton-acid, and operating in such a way, that water of reaction is removed as it is formed, each of $R_1$ and $R_2$ being an alkyl group with a maximum of two carbon atoms.

3. A process for the preparation of an ester of the formula

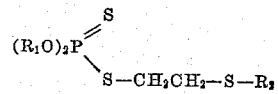

which comprises reacting an acid of the formula

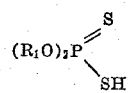

and an alcohol of the formula $$HOCH_2CH_2SR_2$$

in the presence of a proton-acid, and operating in such a way, that water of reaction is removed as it is formed, each of $R_1$ and $R_2$ being an alkyl group with a maximum of two carbon atoms.

4. A process according to claim 2, wherein the reaction is carried out in a solvent medium.

5. A process according to claim 4, wherein the solvent medium is dimethylformamide.

6. A process according to claim 2, wherein the first-named acid is selected from the group consisting of dimethylthiolphosphoric acid and diethylthiolphosphoric acid.

7. A process according to claim 6 wherein the alcohol is hydroxyethylethylsulphide.

8. A process according to claim 2, wherein the water of reaction is removed under reduced pressure.

9. A process according to claim 2, wherein the water of reaction is removed as an azeotrope.

10. A process according to claim 2, wherein the water of reaction is removed by a dehydrating agent.

11. A process according to claim 3, wherein the reaction is carried out in a solvent medium.

12. A process according to claim 11, wherein the solvent medium is dimethylformamide.

13. A process according to claim 3, wherein the first-named acid is selected from the group consisting of dimethyldithiophosphoric acid and diethyldithiophosphoric acid.

14. A process according to claim 13, wherein the alcohol is hydroxyethylethylsulphide.

15. A process according to claim 3, wherein the water of reaction is removed under reduced pressure.

16. A process according to claim 3, wherein the water of reaction is removed as an azeotrope.

17. A process according to claim 3, wherein the water of reaction is removed by a dehydrating agent.

18. A process for the preparation of an ester of the formula

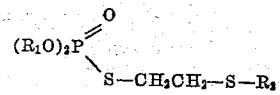

which comprises reacting an acid of the formula

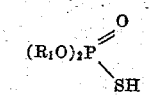

and an alcohol of the formula $$HOCH_2CH_2SR_2$$

in the presence of a Lewis acid, and operating in such a way, that water of reaction is removed as it is formed, each of $R_1$ and $R_2$ being an alkyl group with a maximum of two carbon atoms.

19. A process for the preparation of an ester of the formula

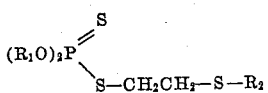

which comprises reacting an acid of the formula

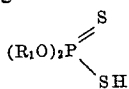

and an alcohol of the formula $$HOCH_2CH_2SR_2$$

in the presence of a Lewis acid, and operating in such a way, that water of reaction is removed as it is formed, each of $R_1$ and $R_2$ being an alkyl group with a maximum of two carbon atoms.

20. A process for the preparation of an ester of the formula

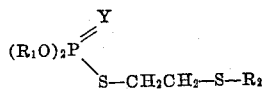

which comprises reacting an alkaline salt of an acid of the formula

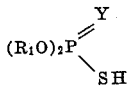

and an alcohol of the formula $$HOCH_2CH_2SR_2$$

in the presence of a proton-acid, and operating in such a way, that any water of reaction is removed as it is formed, $R_1$ in the foregoing formulae being alkyl with 1 to 2 carbon atoms, and $R_2$ being a member selected from the group consisting of uninterrupted alkyl with 1 to 2 carbon atoms, alkylene-O-lower alkyl, and alkylene-S-lower alkyl, and Y is a member selected from the group consisting of O and S.

21. A process for the preparation of an ester of the formula

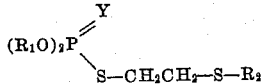

which comprises reacting an acid of the formula

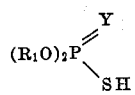

and an alcohol of the formula $$HOCH_2CH_2SR_2$$

in the presence of oleum and dimethylformamide, $R_1$ in the foregoing formulae being alkyl with 1 to 2 carbon atoms, and $R_2$ being a member selected from the group consisting of uninterrupted alkyl with 1 to 2 carbon atoms, alkylene-O-lower alkyl and alkylene-S-lower alkyl, and Y is a member selected from the group consisting of O and S.

No references cited.